Dec. 23, 1958     P. W. MARTIN     2,866,155
APPARATUS FOR VISUALLY INSPECTING OIL WELL CASINGS
Filed March 4, 1955     3 Sheets-Sheet 2
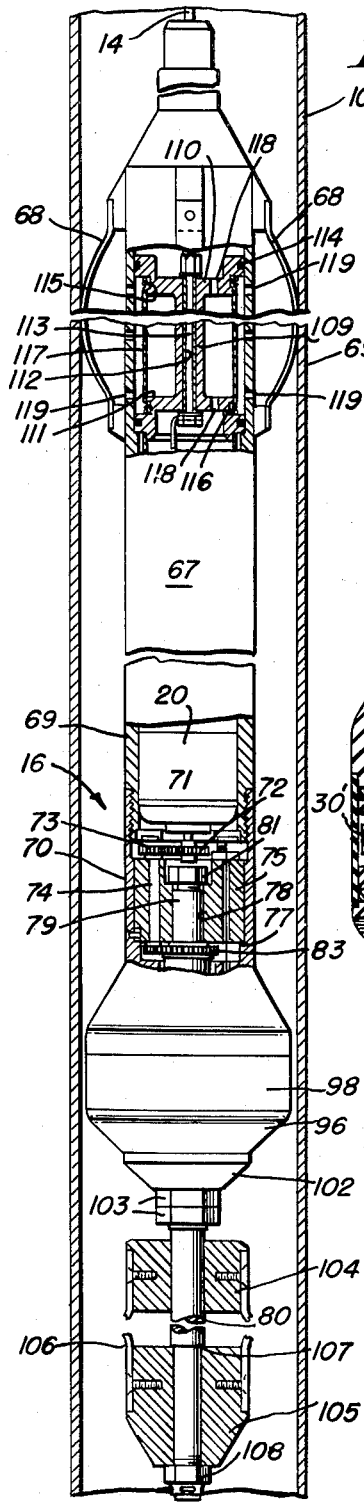
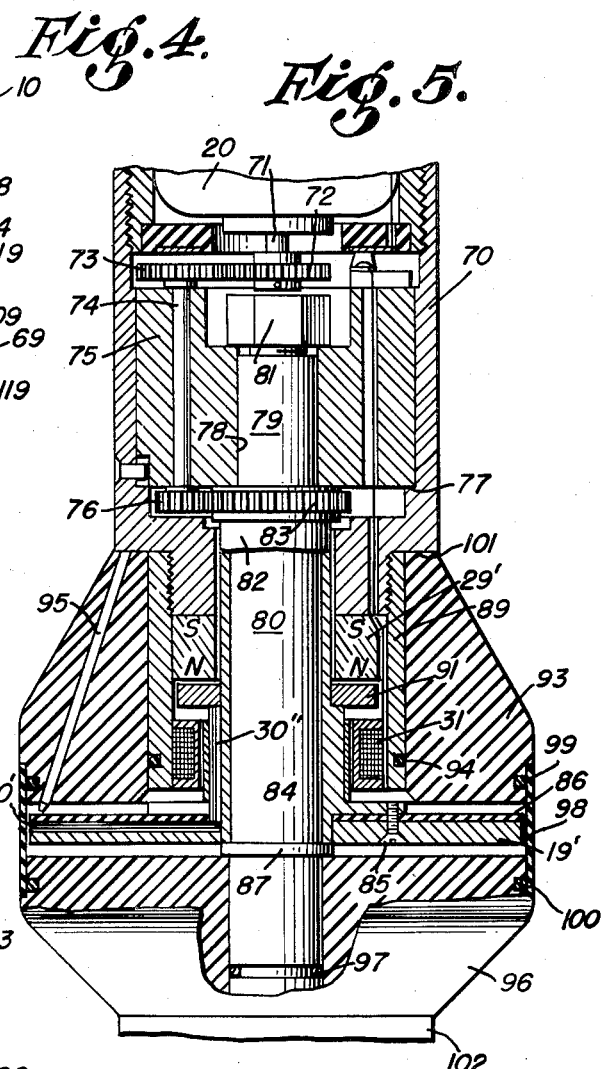
*Fig. 4.*
*Fig. 5.*
PHILIP W. MARTIN
INVENTOR.
BY
*Attorney*

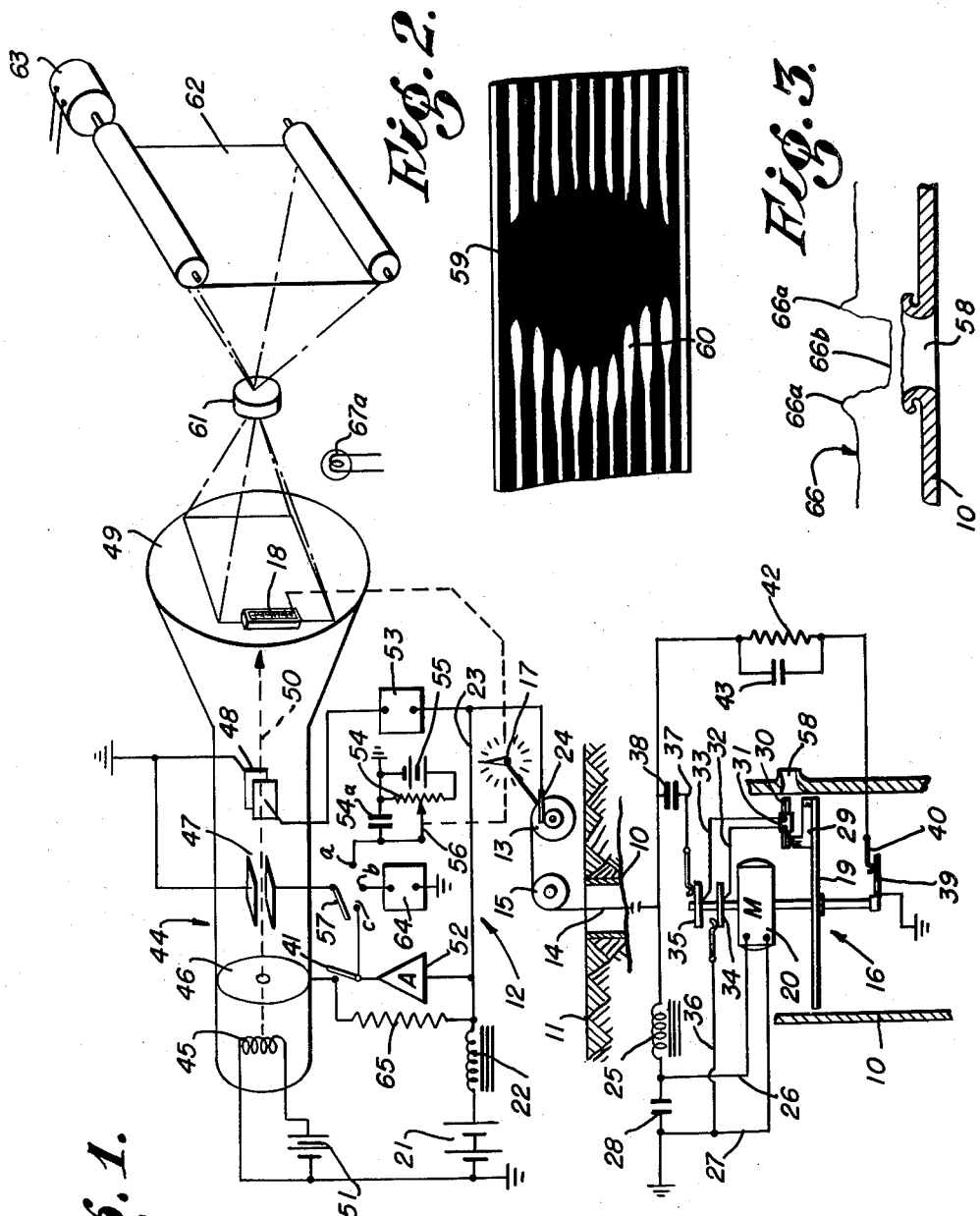

Dec. 23, 1958    P. W. MARTIN    2,866,155
APPARATUS FOR VISUALLY INSPECTING OIL WELL CASINGS
Filed March 4, 1955    3 Sheets-Sheet 3

PHILIP W. MARTIN
INVENTOR.

BY
*Attorney*

United States Patent Office 2,866,155
Patented Dec. 23, 1958

2,866,155
APPARATUS FOR VISUALLY INSPECTING OIL WELL CASINGS

Philip W. Martin, Whittier, Calif.

Application March 4, 1955, Serial No. 492,181

1 Claim. (Cl. 324—37)

The present invention relates generally to apparatus and method for inspecting and indicating characteristics of a material from which tubular members are constructed, and is in particular concerned with such apparatus and method as may be utilized for such purpose in connection with the tubes and casings of well bores.

In the oil industry there has long been a vital need for a device which would enable the obtainment at the surface of an oil well, a picture or visual indication of the conditions existing in the well. For example, it would be of great benefit to be able to determine the nature of perforations in a well casing, and if possible actually see these perforations and be able to determine the nature of the burrs produced by a gun perforator. It would also be very valuable to know the shape of these perforations or holes, and whether there had been any splitting of the casing due to the perforating operation. Likewise, it would also be desirable to be able to see the slots on a slotted liner.

There have been many attempts to produce practical apparatus for such purpose, but in the main such attempts have failed to overcome the inherent obstacles connected with the collection and indication of such information in a manner that will permit intelligent and reliable interpretation. Many attempts have been made to build a camera which could be utilized in an oil well for photographing conditions in the well bore. Photographic means have in the main proved unsuccessful for the reason that such process is dependent upon the use of light. This is a disadvantage, since the well fluids are usually of such character that they are opaque to the transmission of light. Moreover, the casing is visually dirty and very often may have a layer of muck on the inner surface, which prevents or seriously hinders the carrying out of photographic processes.

Other attempts to solve the problem have been directed to the internal calipering of the tubing, drill pipes, casing, etc., in order to locate pits caused by corrosion, or other conditions relating to the tubing or casing of the well bore. Such calipering devices have the common fault of being unable to determine the shape of holes in the tube or casing, the number of the holes, and other details which constitute valuable information.

Having in mind the inherent disadvantages of present equipment, it is an object of the herein described invention to provide novel apparatus for producing a surface image indication of the conditions of the tube or casing in the well bore; which will indicate inconsistencies over various parts of the tube or casing, locate cracks, holes, etc.; and be capable of giving a continuous internal survey of the tube or casing.

In its broad aspects, the present invention briefly comprises surface indicating devices and subsurface instrumentalities which are cooperatively associated in such manner that visible images are obtained, which show the subsurface condition of explored portions of a well casing or tube.

Before the surface, instrumentalities are provided for magnetically scanning the wall of the tube or casing, or by equivalent means setting up signals which are varied in response to variations in the wall structure of the tube or casing, such signals being conducted to the surface and utilized to modulate an electronic beam such as the conventional cathode ray of an oscillograph tube. The electronic beam is horizontally and vertically scanned so as to produce on the target screen of the tube a visual image corresponding with the actual condition of the scanned area of the tube or casing in the well.

The utilization of such apparatus enables the carrying out of the steps of my method in such a way as to overcome the inherent disadvantages of the apparatus and methods heretofore used in attempting to solve the problem, and as a consequence it is possible to obtain a very clear picture at the well surface of the conditions which actually exist in the well tube or casing, and thus obtain satisfactory and reliable information.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a view schematically illustrating the apparatus and method according to the present invention, and diagrammatically showing the electrical interconnections between the various components;

Fig. 2 is a fragmentary view schematically representing a recorded surface image of a scanned surface area of the casing containing a hole in the wall thereof;

Fig. 3 is a view illustrating the correlation between a recorded curve in the detecting equipment and a hole in the casing of the well, whereby depth characteristics are indicated;

Fig. 4 is a view of one form of apparatus by which the method may be practiced, portions being cutaway and sectioned in order to show details of construction;

Fig. 5 is an enlarged fragmentary view partly in section to show in greater detail parts of the apparatus of Fig. 4;

Figure 6:
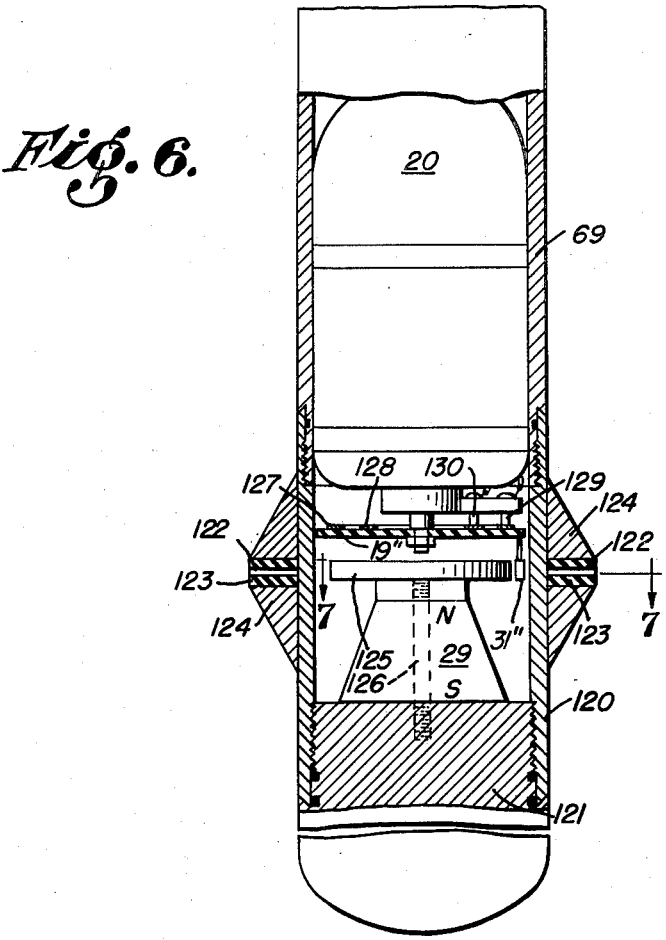
Fig. 6 is a view including a longitudinal section of a different construction.
Figure 7:
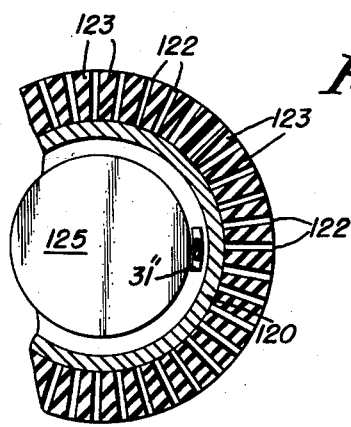
Fig. 7 is a fragmentary transverse section, taken substantially on line 7—7 of Fig. 5.

Referring now to the drawings, Fig. 1, schematically represents a typical well bore structure containing a tubular member, in this instance a casing 10 which passes from the ground surface 11 downwardly through a plurality of different formation structures.

At the ground surface, there is illustrated a surface station, as generally indicated by the numeral 12, and which includes suitable hoisting equipment which may comprise, for example, a hoisting drum 13 from which a hoisting cable conductor 14 is trained over a guide pulley 15 and connected to an exploratory device within the well bore, as generally indicated by the numeral 16, this exploratory device being adapted to be raised and lowered in the well bore by means of the cable 14.

As shown, the hoisting drum is provided with suitable indicating mechanisms, which may comprise a rotating pointer 17 associated with a graduated dial, and may also include a footage meter 18 of convention construction adapted to numerically indicate the cable footage in the well bore, and hence the position of the exploratory device 16.

It will be appreciated that the exploration device may assume various forms of construction in order to carry out the function of scanning the wall surface of the well tube or casing. In its broad aspect, this may be accomplished by providing an exploratory device which contains a rotatably mounted disc 19 of suitable material, such as insulation. Provision is made for rotating this disc by means of a motor 20 arranged to be fed with electric current from a power source 21 at the surface through the following circuit: from one side of the power source through a blocking choke 22; a conductor 23; brush contact 24; cable 14; through a blocking choke 25; conductor 26 to one terminal of the motor 20; from the other terminal of motor 20 through conductor 27 and thence through a ground return to the other side of the power source 21. The blocking choke 25 is cooperatively associated with a capacitor 28 connected across the motor terminals, to form a filter that prevents motor ripple or other disturbances due to the motor operation from being transmitted to the indicating equipment at the surface.

It is proposed in the present invention to magnetically scan the wall of the casing and generate a signal which can be transmitted to the surface indicating equipment. In general this is accomplished by mounting upon the disc 19 near its periphery a source of magnetism, which in this case is depicted as being a permanent magnet 29, one end of this magnet being positioned adjacent the casing wall while the other end is associated with one end of a laminated core structure 30 having its other end adjacent the casing wall. The laminated core structure has mounted thereon a signal coil 31, the terminals of this coil being connected through conductors 32 and 33 respectively with slip rings 34 and 35. The slip ring 34 is connected through a brush with conductor 36 having connection with ground through conductor 27. The slip ring 35 is connected through a brush with conductor 37 containing a blocking capacitor 38 to the cable conductor 14.

Provision is also made for generating a synchronizing pulse at a desired point in the rotation of the disc 19. This is accomplished by providing a rotatably movable contact 39 which is adapted to engage with a stationary contact 40 at a desired point. The engagements of contacts 39 and 40 are adapted to complete a circuit through a charging resistor 42 for a capacitor 43. The capacitor will discharge to ground upon engagement of the contacts 39 and 40 and thus provide a synchronizing signal for use in connection with the indicating equipment of the surface station, as will hereinafter be explained in detail.

At the surface station, instrumentalities are provided for creating an image of the scanned area of the casing wall, and for such purpose a number of known devices may be utilized, for example, a facsimile recorder. However, in the present application, for illustrative purposes, use is made of a cathode ray tube, as generally indicated by the numeral 44. This tube is of conventional design and contains a cathode 45, a control electrode 46, vertical deflection plates 47, horizontal deflection plates 48, and a target screen 49 in the path of the electron beam 50 from the cathode of the tube.

In the arrangement shown, the cathode is arranged to be energized from an electrical source 51. The control electrode 46 is connectible by means of a switch 41 with a conventional amplifier 52 feeding from conductor 23, so that scanning signals emanating from signal coil 31 in the well bore will act to modulate the Z-axis of the beam 50.

One of the horizontal deflection plates is shown as being grounded, while the other plate is connected through a scope synchronizing circuit 53 with the conductor 23 so that a synchronizing signal from the capacitor 43 will act to start the horizontal sweep of the beam at the desired point in the rotation of disc 19. It will be appreciated that, if the vertical deflection plates are now connected with an appropriate deflecting circuit, or other means provided by which the horizontal sweep will be moved successively across the target screen 49, a visual image will be formed thereon in a similar manner to the formation of an image on a television screen.

One arrangement for securing vertical deflection of the horizontal sweep beam is to provide a potentiometer 54 which is connected across a source of electrical potential 55. One end of the potentiometer is connected to the grounded side of a capacitor 54a, while a movable contact 56 of the potentiometer, which is operated by movements of the cable 14, is connected to the other side of the capacitor and to contact a. A switch 57 operatively associated with contact a connects with one of the vertical deflection plates, while the other vertical deflection plate is grounded. With this arrangement, it will be evident that the horizontal scanning of the casing wall will be accomplished by rotation of the disc 19, while up and down movements of the exploratory device will result in vertical displacement of the signal coil 31 and simultaneously will act through variations in the potentiometer 54 to change the vertical deflection of the beam 50.

The operation of the apparatus as just described will now be briefly considered. Let it be assumed that it is desired to determine the characteristics of a section of the wall of casing 10 in the well bore, and further that the area of the wall being explored contains a perforation hole 58 such as might be caused by a gun perforator. A hole is taken merely as an exemplary variation in the casing wall and is considered merely for the purposes of illustration. It is to be understood that other characteristics might be indicated with equal facility, such as cracks, pitted wall surfaces, etc.

The magnetic source, namely, the magnet 29 establishes a magnetic field which follows a magnetic circuit including the core structure 30, and the wall of the casing. It will be appreciated that so long as the magnetic source on the disc 19 is rotated over a uniform casing wall, the reluctance of the magnetic circuit path will remain unchanged and the signal coil 31 will be inactive. Any change which takes place, however, in the material forming of the magnetic circuit will act to change the reluctance of this circuit and will inductively generate a signal in the coil 31. If the scanning process is now carried out, and each time the source of magnetic flux is moved through a circumference of the casing it is vertically changed so that a new path will be scanned during the next circumference, the successive scans will be found to produce a visual image on the target screen of the cathode ray tube, which has an appearance as illustrated in Fig. 2.

The direct signal or amplified signal from the signal coil 31 thus acts to modulate the beam 50 along its Z-axis, and the vertical movements act to vertically displace the beam, while horizontal deflection is controlled by closure of switch contacts 39 and 40. Where operating conditions necessitate, a signal amplifier may be used, this amplifier being positioned in the exploratory device or at the surface. The resulting image therefore appears in black and white or dark and light depending upon the composition of the screen 49, the dark portion 59 in Fig. 2 indicating the image of the hole 58. It will be observed that as the magnetic circuit is moved so that the magnetic flux passes over wall thickness of uniform character, there will be no voltage generated in the pickup signal coil 31, but as soon as a burr is encountered there will be increased flux density which causes a voltage to be generated. Moreover as the scanning proceeds and the hole opening is positioned in the flux path circuit, the flux density will be reduced and the voltage will be so changed as to darken the screen pattern. InI the photograph in Fig. 2, it will be noted that there is an increased light intensity in the image as indicated at 60. This indicates the presence of a burr on the casing.

Under certain circumstances, it may be desired to permanently record the image as it appears on the target screen 49. This may be accomplished by means of a suitable camera which has been indicated as including a lens 61 and a photographic film 62 arranged with a driving motor 63 capable of being adjustably synchronized so that the movement of the film will correspond with the up and down movement of the exploratory device during the scanning operation.

When movement of the film 62 is thus synchronized, the contact 56 of the potentiometer may be disconnected with respect to the vertical deflection plates, as the movement of the photographic film 62 will vertically separate the successive horizontal traces of the beam, and thus serve a similar purpose to the action of the vertical deflection plates.

It is also contemplated that a conventional uniform vertical deflection circuit 64 may be utilized, in which case the film 62 would not be moved, as previously explained. The deflector plates are connected for uniform deflection during the horizontal scanning of the casing wall area under consideration by moving the switch 57 into engagement with an associated contact b.

Under some circumstances it may be desirable to obtain a detailed indication of the variations in the signal voltage from the coil 31, and when so desired the image pattern may be changed to give a depth interpretation by moving switch 57 into engagement with an associated contact c, which connects the vertical deflection plates with the modulating circuit of the control electrode 46. When this is done, of course, switch 41 will be opened, and potential is then applied to the electrode 46 by a resistor 65. The image which is secured under these circumstances is illustrated in Fig. 3 which shows the hole 58 in the casing wall. The corresponding trace which would be indicated on the target screen 49 is identified by numeral 66. In this trace, there will be deflections at 66a corresponding with the burr portions of the hole, and an opposite deflection 66b in the open portion of the hole. In other words, this gives a visual indication depthwise with respect to the wall surface.

When utilizing the movable film 62, which is synchronized with the cable conductor movement, indications of the well exposition of the exploratory device may be periodically obtained by momentarily lighting the footage meter 18 with a source of light 67a which will give an indication on the film for reference.

Referring now to Fig. 4, there is illustrated a construction of exploratory device which incorporated the basic principles of the arrangement diagrammatically and schematically illustrated in Fig. 1. As shown, the exploratory device embodies an elongate tubular housing 67 of somewhat smaller diameter than the casing 10, the housing at its uppermost end being arranged for attachment to the cable conductor 14, and being fitted with circumferentially spaced bowed spring members 68 which serve to axially align the upper end of the exploratory device housing within the casing. The housing in general is comprised of two inter-connected sections 69 and 70 of iron or other suitable material, the section 69 including parts of the control equipment and the motor 20 which has a driving shaft 71 fitted with a driving gear 72 having meshed relations with a gear 73 at one end of the shaft 74 mounted for rotation in a supporting block 75 and having a gear 76 at its other end. The block 75 is peripherally supported at the lower end of section 70 upon a circumferentially extending internal flange 77. The block 75 has a central bore 78 within which a contracted end 79 of a rod 80 of nonmagnetic material is secured in depending position by means of a retaining nut 81.

The rod 80 forms a support for an elongate sleeve 82 of nonmagnetic material, as shown in Fig. 5, which is fitted at one end with a ring gear 83 having meshed relation with gear 76, by which the sleeve may be rotated at reduced speed. The other end of the sleeve 82 has an end flange 84 to which there is secured a disc 19' of aluminum or other suitable material by means of securing screws 85, the flange and disc having a spacer member 86 of insulating material interposed between them. Adjacent this end of the sleeve 82 is a retaining ring 87 on the rod 80 which cooperates with the block 75 to retain the sleeve against axial movements on the rod but permit rotative movement thereof.

The disc 19' is radially grooved and the sleeve 82 longitudinally grooved to respectively receive stacks of laminations 30' and 30''. These laminations have abutting ends, the laminations 30' extending outwardly from the sleeve 82 to the periphery of the disc 19', while the laminations 30'' extend along the sleeve 82 and provide a flux path in this arrangement within a pickup coil 31'.

The rotating structure thus far described above is contained within a stationary housing which will now be described. In spaced relation and surrounding the sleeve 82, a tubular member 89 of nonmagnetic material is secured at one end to the adjacent end of the section 70 so as to form an extension within which an annular permanent magnet 29' is positioned, this magnet being concentric and surrounding the rotatable sleeve 82. This magnet is associated with a pole piece 91 carried by the sleeve, the pole piece being positioned between the magnet and the adjacent end of the pickup coil 31' and being in contact with the adjacent end of the stack of laminations 30''.

Externally of the tubular member 89, the housing is composed of an annular ring 93 of insulating material such as Bakelite, the ring being internally sealed with respect to the member 89 by a sealing ring 94. At one point in the circumference of the ring 93, there is imbedded an iron rod 95 having an inclined position, one end of this rod being in contact with the material of section 70, while the other end of the rod is adjacent the path of movement of the laminations 30'.

Below the disc 19', there is placed another section of ring insulation 96 which surrounds the adjacent portion of the rod 80 and is sealed with respect thereto by a sealing ring 97. The rings 93 and 96 are of general frusto-conical configuration and are joined at their peripheries by a circumferentially extending band 98 which is sealed by O-rings 99 and 100 with respect to the associated sections. The assembled ring 93, band 98 and ring 96 are clampingly secured between an abutment wall 101 on the section 70 and a clamping ring 102 by nuts 103 (Fig. 4) having threaded engagement with the associated rod 80.

The rod 80 is extended beyond the structure just described to form a support for spaced collar members 104 and 105 which are respectively secured to the ends of bowed spring members 106 which cooperate with the previously described bowed members 68 at the upper end of the exploratory device, and by means of which the device is axially aligned within the well casing. The collar member 105 is clamped between a shoulder 107 on the rod 80 and a securing nut 108 having threaded engagement with the associated end of the rod 80.

With further reference to the construction disclosed in Figs. 4 and 5, it will be appreciated that the band 98 is not constructed to withstand the application of well pressures on its external surface only, and for this reason provision is made for hydrostatically balancing the internal pressure of the exploratory unit with the pressure existing exteriorly thereof.

As more specifically shown in Fig. 4, the uppermost end of the section 69 is provided with a pressure responsive structure which is constructed with a spool shaped body embodying a cylindrical axle 109 which is integrally formed with end flanges 110 and 111. The axle 109 has a central passage 112 which serves as a duct for a current carrying conductor 113 which is insulatingly supported therein. Each of the end flanges is circumferentially grooved to receive a sealing ring 114 by which the periphery of the flange is sealed with respect to the wall of the section 69. The end flanges are circumferentially grooved on their confronting or inner faces to provide annular flanges 115 and 116 adapted to receive thereover and have secured thereon the respective ends of a tubular sleeve 117 of suitable flexible material.

The sleeve 117 cooperates with the axle 109 to form an internal compartment which communicates through openings 118 with the interior of the exploration unit which together with the interior of the sleeve are filled with a suitable oil such as kerosene or other appropriate liquid. The exterior of the sleeve between the sealed end flanges is arranged to communicate with the exterior of the exploration device through wall openings 119. With this arrangement, variations in external well pressure act upon the sleeve 117, to change the internal pressure of the liquid in the exploration device, thus maintaining balanced hydrostatic conditions. Thus, since the internal pressure acting on the band 98 will always be equal to the external pressure acting thereon, this band will be free of pressures which might otherwise disrupt the material.

The structure shown in Figs. 4 and 5 and as just described above operates on the same basic principles as the arrangement diagrammatically illustrated in Fig. 1. The only difference is in slight modifications of arrangement of some of the elements. In the arrangement of Fig. 1, the magnet 29, laminations 30 and pick up coil 31 were revolved as a unit. In the arrangement of Figs. 4 and 5 the permanent magnet 29' and pickup coil 31' are stationary, the laminations 30' and 30" only being revolved within the casing of the well. The operation is the same, however, since the magnetic circuit interlinked with the coil is through the laminations and wall of the casing.

In the arrangement of Fig. 1, switch contacts 39 and 40 were utilized to control a synchronizing pulse for the horizontal deflector plates. In the arrangement of Figs. 4 and 5 the pulse is controlled magnetically by completing a low reluctance magnetic circuit through the coil by moving the laminations 30' past the associated end of the iron rod 95.

Referring now to Fig. 6, a different arrangement is disclosed for accomplishing the same purposes as in the arrangements previously described, but which does not require the utilization of hydrostatic balancing means for equalizing the interior pressures with the well pressures. In this arrangement, the exploratory device is provided with a removably connected section 120 which is adapted at one end to be connected with a section such as the previously described section 69, and at its other end connected with an end plug section 121.

The section 120 is in this case provided intermediate its ends with a plurality of radially extending rods 122 of paramagnetic material embedded in a surrounding ring of non-magnetic material 123 which supports the rods in a right angled plane surrounding the wall of section 120. On each side of the ring 123, there is an inclined fillet 124 to protect the ring 123 during raising and lowering movements of the exploratory device. It is desirable to have the outermost ends of the rods 122 positioned in close proximity to the inner surface of the casing or tube which is being explored. This arrangement therefore provides a construction which may be made up in several sizes to fit casings or tubes of different internal diameters, without having to make extensive changes in the equipment.

In this form of the invention, a source of magnetism, such as a permanent magnet 29" is fitted with a disc shaped pole piece 125 which serves also as a clamping member to clamp the magnetic source 29" against the associated end of end plug section 121, a securing stud 126 being respectively engaged at its ends with the pole piece and the end plug.

The pole piece 125 is symmetrically positioned with respect to the plane of the rods 122, and has its periphery inwardly spaced somewhat from the inner wall of the section 120 to form an air gap in the magnetic circuit from the magnetic source 29", through the pole piece 125, the rods 122 and the wall of the casing 10 which is to be explored. It is believed evident that in this arrangement discrete magnetic flux paths are formed which extend radially through the rods 122 circumferentially of the casing being explored, and that where there are no imperfections in the wall of the casing, these flux paths will be similar. However, in the event of an imperfection in the wall of the casing adjacent the outer end of one or more of the rods 122, the discrete magnetic circuit including the rod will have a flux density which differs from the flux density of a rod associated with a portion of the casing wall which is perfect.

Now, if a pickup coil 31" is suspended from a disc 19", this coil as it is rotated about the periphery of the pole piece 125 will be successively interlinked with the magnetic flux passing through the respective rods 122, and will have voltages induced therein which reflect the character of the successive wall portions circumferentially of the casing being explored in the same manner as where the magnetic field is revoived as previously described.

In the arrangement shown in Fig. 6, the disc 19" is provided with a pair of concentrically positioned conducting rings 127 and 128 which are associated with suitable brush contacts 129 and 130 to which the circuit connections are made.

Having thus described several embodiments of my invention, it is appreciated that various modifications may suggest themselves to those skilled in the art without departing from the spirit of my invention, and, hence, I do not wish to be restricted to the specific form or forms shown or uses mentioned, except to the extent indicated in the appended claim.

I claim:

In apparatus for remotely producing an indication of a well casing wall characteristic; a tubular envelope adapted to be raised and lowered in a well casing; a source of magnetic flux in said envelope; a plurality of circumferentially positioned rods of paramagnetic material projecting radially from the outer surface of said envelope and forming discrete magnetic flux paths between said source and adjacent wall of the well casing; a movable pickup coil arranged to be successively interlinked with the respective magnetic flux paths; and surface indicatiing means connected with said coil.

References Cited in the file of this patent

UNITED STATES PATENTS

| Re. 21,927 | Brace et al. | Oct. 21, 1941 |
| 2,388,683 | Frickey et al. | Nov. 13, 1945 |
| 2,527,170 | Williams | Oct. 24, 1950 |
| 2,533,350 | Bayhl | May 15, 1951 |
| 2,617,854 | Van Valkenburg | Nov. 11, 1952 |
| 2,684,464 | Hastings et al. | July 20, 1954 |